(12) United States Patent
Pandya et al.

(10) Patent No.: US 8,930,551 B2
(45) Date of Patent: Jan. 6, 2015

(54) DIVERSE SOURCE MESSAGE ASSOCIATION

(75) Inventors: Ajay Pandya, Ottawa (CA); Felix Katz, Nepean (CA)

(73) Assignee: Alcatel Lucent, Boulogne-Billancourt (FR)

(*) Notice: Subject to any disclaimer, the term of this patent is extended or adjusted under 35 U.S.C. 154(b) by 412 days.

(21) Appl. No.: 12/708,156

(22) Filed: Feb. 18, 2010

(65) Prior Publication Data

US 2011/0202660 A1    Aug. 18, 2011

(51) Int. Cl.

| | | |
|---|---|---|
| G06F 15/16 | (2006.01) | |
| H04L 29/12 | (2006.01) | |
| H04L 12/14 | (2006.01) | |
| H04M 15/00 | (2006.01) | |
| H04W 4/24 | (2009.01) | |

(52) U.S. Cl.
CPC ............. *H04L 61/106* (2013.01); *H04L 12/14* (2013.01); *H04L 12/1403* (2013.01); *H04L 29/12188* (2013.01); *H04L 61/1588* (2013.01); *H04M 15/00* (2013.01); *H04M 15/41* (2013.01); *H04M 15/61* (2013.01); *H04M 15/62* (2013.01); *H04M 15/66* (2013.01); *H04M 15/8011* (2013.01); *H04M 15/8228* (2013.01); *H04W 4/24* (2013.01)
USPC ............................ 709/228; 709/224; 709/230

(58) Field of Classification Search
None
See application file for complete search history.

(56) References Cited

U.S. PATENT DOCUMENTS

2010/0291923 A1* 11/2010 Zhou et al. ................. 455/432.1
2012/0117235 A1*  5/2012 Castro Castro et al. ...... 709/224

FOREIGN PATENT DOCUMENTS

CN          101217810 A1    7/2008
WO          2009089759        7/2009

OTHER PUBLICATIONS

3rd Generation Partnership Project; Technical Specification Group Core Network and Terminals; Policy and Charging Control signalling Flows and QoS parameter mapping; (Release 9) 3GPP Standard; 3GPP TS 29.213, 3rd Generation Partnership Project (3GPP), Mobile Competence Centre; 650 Route DED Lucioles; F-06921 Sophia-Antipolis Cedex; France. No. V9.1.0, Dec. 18, 2009, pp. 1-127, XP050401209.
"3rd Generation Partnership Project; Technical Specification Group Services and System Aspects; Policy and charging control architecture (Release 9)" 3GPP Standard; 3GPP TS 23.203, 3rd Generation Partnership Project (3GPP) Mobile Competence Centre; 650, Route Des Lucioles; F-06921 Sophis-Antipolis Cedex; France, No. V9.3.0, Dec. 10, 2009, pp. 1-123.
Anonymous, "ST40 Multimedia Core Platform", Mar. 20, 2009, pp. 1-8, XP55002952, retrieved from the Internet: URL:http://web.archive.org/web/20090320050402/http://www.starentnetworks.com/File/StarentNetworks_ST40-0407.pdf. [retreived on Jan. 18, 2011].
International Search Report for PCT/IB2011/000632 dated Jul. 26, 2011.

(Continued)

*Primary Examiner* — Patrice Winder
(74) *Attorney, Agent, or Firm* — Kramer Amado P.C.

(57) ABSTRACT

Various exemplary embodiments relate to a method and related network node and machine-readable storage medium including a policy and charging rules node (PCRN) receiving a plurality of related service requests from different devices. The PCRN may proceed to generate a policy and charging control (PCC) rule based on at least one service request and other information stored in the PCRN if a mate service request does not arrive during the duration of a waiting timer. If the mate service request arrives subsequent to the expiry of the waiting timer, the PCRN may then generate a subsequent PCC rule to replace the previously generated rule, with the new PCC rule incorporating information from both of the mate service requests.

20 Claims, 7 Drawing Sheets

(56) References Cited

OTHER PUBLICATIONS

Korean Office Action for Application No. 2012-7021476; Pursuant to PCT/IB2011/000632 dated Sep. 26, 2013.

Policy and Charging Control signaling flows and (QoS) parameter mapping, 3GPP Standard, 3GPP TS 29.213, 3rd Generation Partnership Project Jan. 20, 2010.

Chinese Office Action dated May 4, 2014 for Chinese Application No. 201180009944.X.

* cited by examiner

DIVERSE SOURCE MESSAGE ASSOCIATION

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212, 29.213, and 29.214 specifications provide some guidance on handling multiple messages from different sources and dynamic session management. These specifications, however assume that each messages received always contain all same amount of information, with the information used to bind related messages. However, the system may not always encounter such happenstance, as the specifications and real-world applications allow different messages to contain different information.

In view of the foregoing, it would be desirable to provide a method for handling the binding of related messages. In particular, it would be desirable to provide a system that may receive multiple related messages and bind them in a PCRF.

SUMMARY

In light of the present need for a method for handling and binding multiple related messages, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Diameter Proxy Agent (DPA) within a Policy and Charging Rules Node (PCRN) to associate at least two messages received from a plurality of devices, the method comprising receiving a first message from a first device, the first message containing a first Session Binding Identifier (SBI) comprising at least one attribute associated with a first subscriber profile, forwarding the first message to a first PCRN blade in a plurality of PCRN blades comprising the PCRN, the first PCRN blade creating a first session for the first message, receiving a second message from a second device, the second message containing a second SBI comprising at least one attribute associated with a second subscriber profile, and forwarding, by the DPA, the second message to the first PCRN blade when the first SBI of the first message and the second SBI of the second message are associated with the same subscriber profile.

Various embodiments may also relate to a Policy and Charging Rules Node (PCRN) to associate at least two messages received from a plurality of devices, the PCRN comprising a Diameter Proxy Agent to receive at least a first message from a first device, the first message containing a first Session Binding Identifier (SBI) comprising at least one attribute associated with a first subscriber profile, and to receive a second message from a second device, the second message containing a second SBI comprising at least one attribute associated with a second subscriber profile, and at least a first PCRN blade in a plurality of PCRN blades comprising the PCRN, to receive the first message and to create a first session for the first message, wherein the DPA forwards the second message to the first PCRN blade when the first SBI of the first message and the second SBI of the second message are associated with the same subscriber profile.

Various embodiments may also relate to a machine-readable storage medium encoded with instructions for a Diameter Proxy Agent (DPA) within a Policy and Charging Rules Node (PCRN) to associate at least two messages received from a plurality of devices, the machine-readable storage medium comprising instructions for receiving a first message from a first device, the first message containing a first Session Binding Identifier (SBI) comprising at least one attribute associated with a first subscriber profile, instructions for forwarding the first message to a first PCRN blade in a plurality of PCRN blades comprising the PCRN, the first PCRN blade creating a first session for the first message, instructions for receiving a second message from a second device, the second message containing a second SBI comprising at least one attribute associated with a second subscriber profile, and instructions for forwarding, by the DPA, the second message to the first PCRN blade when the first SBI of the first message and the second SBI of the second message are associated with the same subscriber profile.

It should be apparent that, in this manner, various exemplary embodiments enable dynamic binding of multiple messages originating from diverse sources. Particularly, by using a session binding identifier, the PCRF may bind messages that may contain the same information sets and may implement such messages in an applicable session.

BRIEF DESCRIPTION OF THE DRAWINGS

In order to better understand various exemplary embodiments, reference is made to the accompanying drawings, wherein.

DETAILED DESCRIPTION

Figure 1:
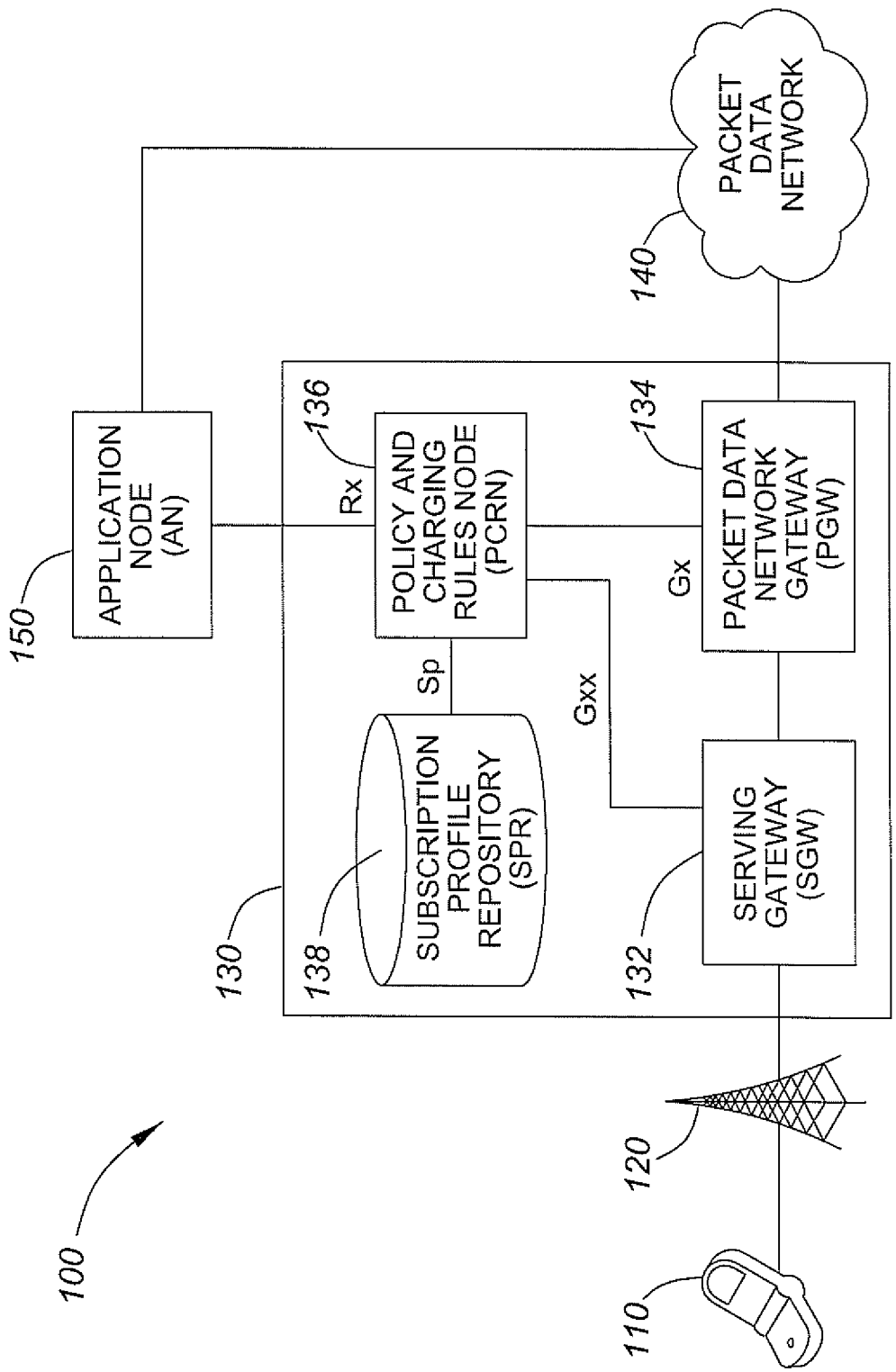
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include user equipment 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio communication, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile IP (PMIP) standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (FCC) rules for each service data flow (SDF). Thus, PGW 134 may be a policy and charging enforcement node (PCEN). PGW 134 may include a number of additional features such as, for example, packet filtering, deep packet inspection, and subscriber charging support.

Policy and charging rules node (PCRN) 136 may be a device that receives requests for services, generates PCC rules, and provides PCC rules to the PGW 134 and/or other PCENs (not shown). PCRN 136 may be in communication with AN 150 via an Rx interface. PCRN 136 may receive requests from AN 150, SGW 132, or PGW 134. Upon receipt of a service request, PCRN 136 may generate at least one new PCC rule for fulfilling the service request.

PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or voice communication service to user equipment 110. AN 150 may further be in communication with the PCRN 136 of the EPC 130 via an Rx interface. When AN 150 is to begin providing application service to user equipment 110, AN 150 may generate a request message, such as an AA-Request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Figure 2:
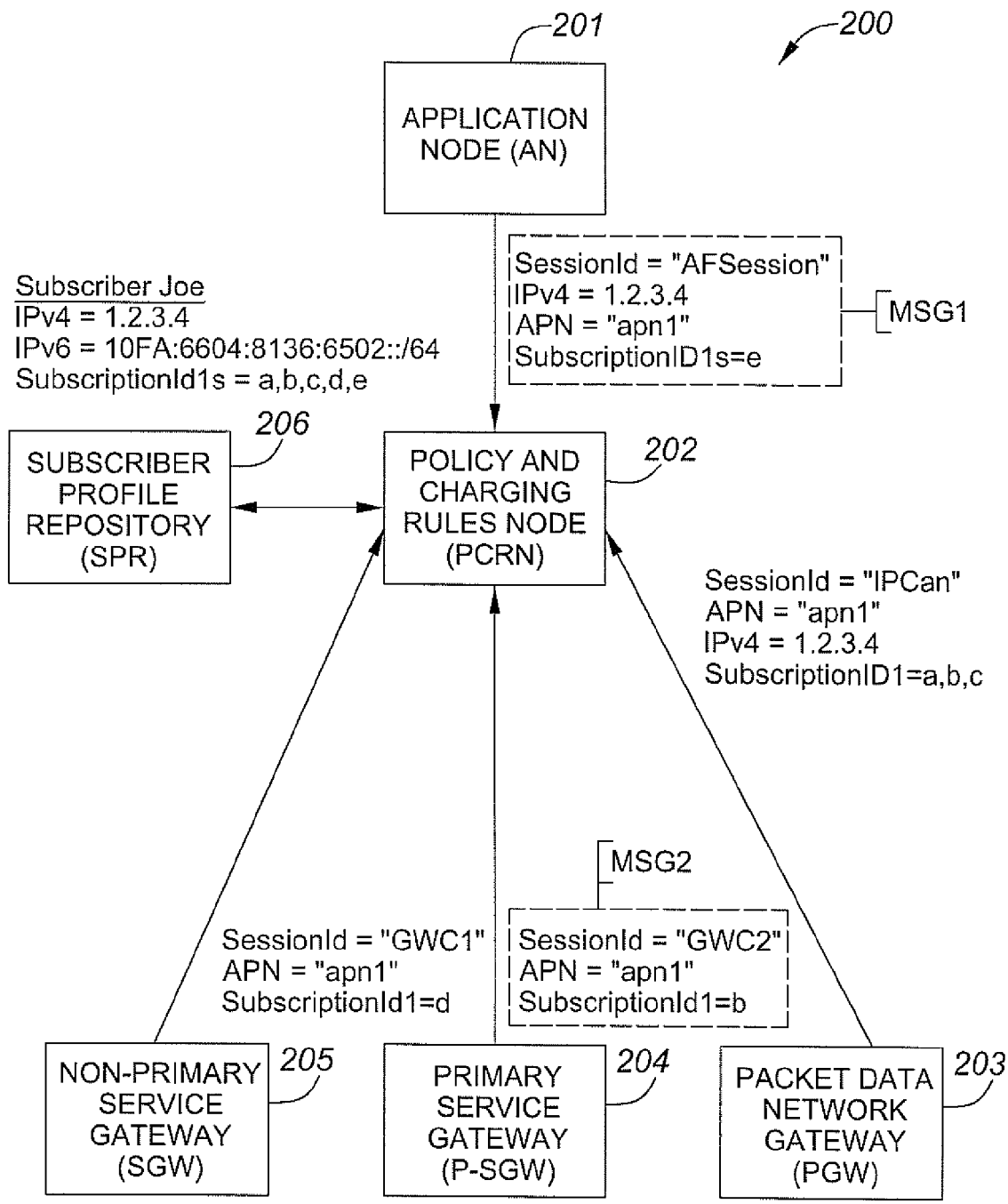
FIG. 2 illustrates an exemplary network for a PCRN receiving multiple related messages from a plurality of sources.

FIG. 2 illustrates an exemplary communications network, with a PCRN receiving multiple messages from a plurality of devices. System 200 is similar to system 100, with application node (AN) 201, policy and charging rules node (PCRN) 202, packet data network gateway (PGW) 203, primary service gateway (P-SGW) 204, and non-primary service gateway (SGW) 205 and subscriber profile repository (SPR) 206 corresponding to AN 150, PCRN 136, PGW 134, and SPR 138, respectively.

In system 200, multiple related messages may be sent through multiple devices, such as AN 201, PGW 203, P-SGW 204, and SGW 205, with each message eventually being sent to the PCRN 202. PCRN 202 may then take the information from each message and determine whether the received message relates to any other message the PCRN 202 received. PCRN 202 may then bind any related messages together, which may also include related messages sharing a common established session.

For example, AN 201 may send a message (MSG1) to the PCRN 202 that includes information such as its session identification, IPv4 address, at least one subscription identifier, and Access Point Name (APN). Similar messages may also include an IPv6 prefix. The PCRN 202 may then use the information included in MSG1 to determine if the PCRN 202 previously received any related information and, if so, to where the related message was stored or directed. This may enable the PCRN 202 to bind multiple messages within the same component and enable the multiple messages to share a common session.

PCRN 202 may determine if MSG1 is related to previously received or stored messages by querying the SPR 206 via the Sp interface. For each message received by the PCRN 202, the PCRN 202 may construct a Session Binding Identifier (SBI). The PCRN 202 may then use attributes included in the message's SBI to compare with subscriber profiles stored in SPR 206. The SBI may include any and all information included in a subscriber profile, including, for example, an IPv4 address, IPv6 prefix, APN, and/or subscription identifier. However, a message's SBI may only have information included within the particular message. In system 200, for example, the SBI of MSG1 sent from the AN 201 to the PCRN 202 may only include the session identifier, IPv4 address, APN, and subscription identifier, but the SBI does not contain an IPv6 prefix.

The PCRN 202 may subsequently receive another message from another device. For example, P-SGW 204 may send a second message (MSG2) to PCRN 202. The SBI of the second message, in contrast to the SBI of MSG1, may contain a session identifier, APN, and subscription identifier. If the PCRN 202 directly compares the two messages, the PCRN 202 may not determine that the two messages are related, as the information included in the SBIs of MSG1 and MSG2 do not directly match each other (e.g., the session and subscription identifiers do not match). In fact, the only information in the two messages that directly match may be, for example, the APN. However, when the PCRN 202 uses the subscription profile stored in the SPR 206, the PCRN 202 may determine that MSG1 and MSG2 are related to the same profile and therefore should be bound and handled as a group. This may include, for example, binding the application session used by MSG1 with the gateway session used by MSG2. This may also include storing the messages in the same blade of the PCRN 202.

Figure 3:
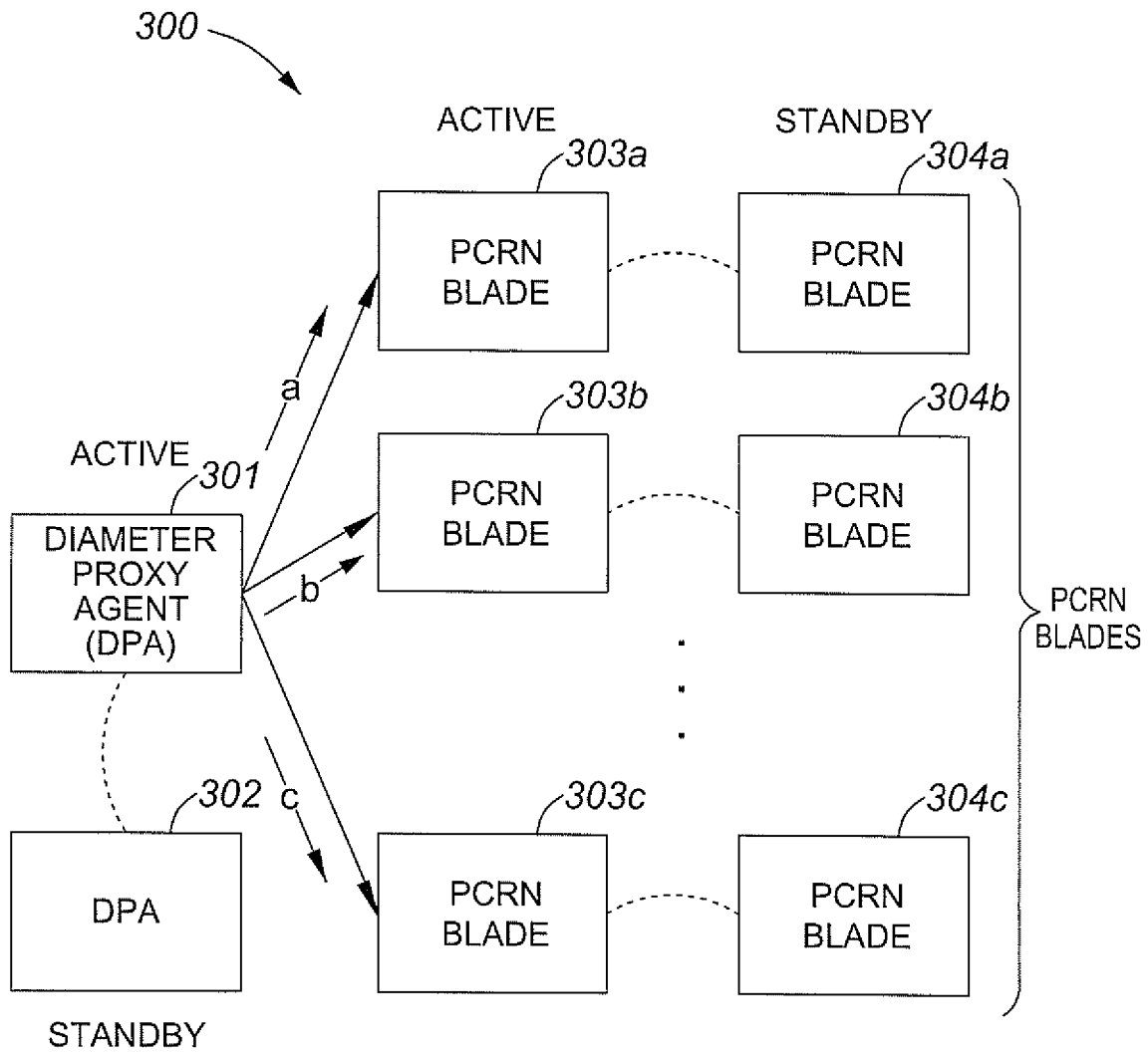
FIG. 3 illustrates an exemplary policy and charging rules node (PCRN) and its constituent PCRN blades for handling multiple messages within the PCRN.

Referring now to FIG. 3, an exemplary policy and charging rules node (PCRN) is illustrated. The PCRN 300 may be similar to PCRN 136 and PCRN 202 of systems 100 and 200, respectively. The PCRN 300 may comprise an active Diameter Proxy Agent (DPA) 301, a standby DPA 302, a plurality of active PCRN blades 303a-c, and a plurality of standby PCRN blades 304a-c. The PCRN 300 may include a plurality of PCRN blades 303a-c, 304a-c for enhanced performance through the implementation of parallel processing, with each PCRN blade 303a-c, 304a-c having parallel, redundant PCRN engines. When the PCRN 300 receives a message from another device, the message may be processed and stored in one of the plurality of non-overlapping active PCRN blades 303a-c. The PCRN 300 may also store the message a PCRN blade's respective backup 304a-c.

The Diameter Proxy Agent (DPA) 301 may act as a proxy for all the installed PCRN blades 303a-c, 304a-c in PCRN 300. DPA 301 is active and may therefore receive each message sent to the PCRN 300 and then direct the message to a specific PCRN blade, e.g. PCRN blade 303b based on a specified criteria. For example, DPA 301 may conduct a lookup to compare a received message's SBI with subscriber profiles stored in SPR 138 via the Sp interface. In alternative embodiments, DPA 301 may only compare an incoming message's SBI with stored SBIs of previously received messages, as DPA 301 may store the SBI of every message received as it forwards the message to a particular PCRN blade 303a-c. If the analysis of an incoming message's SBI results in a match, DPA 301 may forward the incoming message to the PCRN blade that is handling the related message. Otherwise, the DPA 301 may employ other criteria or methods known to those of skill in the art as useful to assign an incoming message to a PCRN blade 303a-c.

Following the example from FIG. 2, the DPA 301 may receive a first message MSG1. As it is the first message received, a comparison of SBIs will result in no match to previous messages received. DPA 301 may therefore employ another method to choose a destination PCRN blade 303a-c. For example, DPA 301 may use a load balancing technique to choose a PCRN blade 303a-c so as not to overload a particular blade. In other embodiments, the DPA 301 may also or alternatively employ a round-robin technique, resulting in a queue for PCRN blades 303a-c, where DPA 301 may first send new, non-matching messages to PCRN blade 303a, then the next new, non-matching message PCRN blade 303b, etc. Alternative embodiments may have DPA 301 use a combination of the two techniques, with the DPA 301 first using a load-balancing technique, then using a round-robin technique if there are equally-viable candidates for a target PCRN blade 303a-c. A person of ordinary skill in the art would be knowledgeable of other techniques to assign incoming messages to candidate PCRN blades 303a-c. In this example, DPA 301 assigns MSG1 to PCRN blade 303a.

During the assignment of MSG1 to PCRN blade 303a, DPA 301 may store the location of MSG1, including the SBI of MSG1 and the destination PCRN blade (i.e., PCRN blade 303a). DPA 301 may also backup the new correlation in standby DPA 302. MSG1 may then be sent to PCRN 303a. PCRN 303a may first store the incoming message in standby PCRN blade 304a. PCRN blade 303a may first check the session ID of the incoming message to determine the source of the incoming message. This may determine which checking method PCRN blade 303a will employ, as will be discussed below in relation to FIGS. 4-6. As there are no matching messages, PCRN blade 303a may then employ a new session for MSG1 based on the session ID of the incoming message. For example, MSG1 may have a session ID of "AFsession," which may cause PCRN blade 303a to begin an application session. In order to communicate with the PGW 134 to, for example, forward created policy charging control (FCC) rules to the gateways via the Gx interface, PCRN blade 303a may also establish a new IP-CAN session with the created application session.

DPA 301 may at some later time receive a second message MSG2, as discussed above in relation to FIG. 2. Accordingly, in this example, MSG2 is related to MSG1 and have linked SBIs, as the SBI of each message belong to the same unique subscriber. As such, when the DPA 301 compares the SBI of MSG2 against its stored SBIs and corresponding subscriber profiles via the Sp interface, the result may be a relation between MSG1 and MSG2 due to the common subscriber profile of the linked SBIs. As a result, DPA 301 may determine the destination of related message MSG1, which in this example is PCRN blade 303a. DPA 301 may then forward the second message MSG2 to the same PCRN blade as MSG1 (PCRN blade 303a) and store the destination PCRN blade 303a of the second message.

After reaching PCRN blade 303a, the PCRN blade 303a may first determine the origin of the second message by checking the session ID of the second message. This may determine which checking method PCRN blade 303a will employ, as will be discussed below in relation to FIGS. 4-6. In this example, MSG2 has a session ID of "GWC2," which causes the PCRN blade 303a to first establish a gateway control session. As will be discussed in relation to FIG. 5, PCRN blade 303a may then examine other criteria of the incoming message's SBI to determine whether to bind the newly-established gateway control session with the IP-CAN session established when the PCRN blade 303a received the first message. As the APNs match and the subscription IDs belong to the same subscriber, the PCRN blade 303a may bind the gateway control session and the IP-CAN session, with the first and second messages MSG1, MSG2 bound using the combined application, gateway control, and IP-CAN sessions within PCRN blade 303a. As will be discussed below in relation to FIGS. 4-5, the PCRN blade 303a may also match subsequent messages from other devices, such as the PGW 134, and the non-primary gateway SGW 205, with the messages all sharing the established session within PCRN blade 303a.

Figure 4:
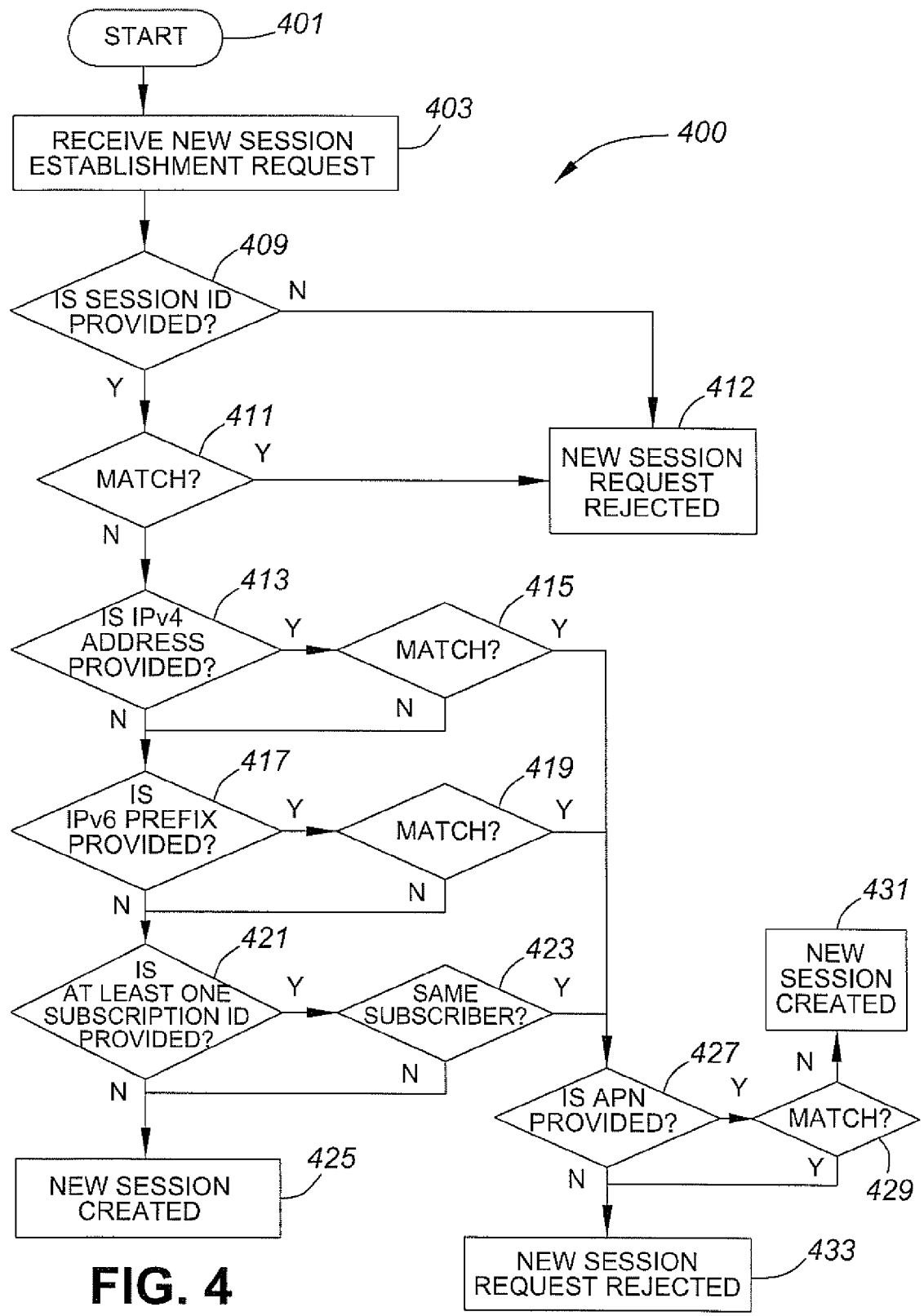
FIG. 4 illustrates an exemplary method for establishing a new session created by a gateway.

Referring now to FIG. 4, an exemplary method performed by the PCRN 202 for creating a new gateway session with established sessions is provided. When the PCRN 202 receives a message from the PGW 203, P-SGW 204, or SGW 205, the message may trigger a new session request. A PCRN blade 303a-c may employ method 400 to determine whether to establish a new session based on the request.

Method 400 begins at steps 401-403, where the PCRN 202 may receive a new session establishment request from an incoming message via either the Gx or Gxx interface. If the message is received from a service gateway (P-SGW 204 or SGW 205) via the Gxx interface, the new session request may be for a new gateway control session. Otherwise, if the message is received from a packet data network gateway PGW 203 via the Gx interface, the new session request may be for a new IP-CAN session. PCRN 202 may then proceed to steps 409-433, where the PCRN 202 may check various attributes of the incoming message's SBI to determine whether there is already an existing session that fully or partially matches the session specified in the request.

Following the receipt of the new session establishment request, in steps 409-419, the PCRN may first determine if the SBI of an incoming message contains the specified attribute. In step 409, the PCRN 202 may determine if the SBI for MSG1 contains a session ID. If the attribute is included in the SBI, then the PCRN 202 may determine in a next step (step 411) whether the attribute matches the attributes of any previous messages; otherwise, the new session request may be rejected by the PCRN 202 in step 412, as the session ID may be required for each new session. For example, MSG1 contains a session ID equivalent to "AFsession." Therefore, the PCRN 202 in step 411 may determine whether an existing session already has the equivalent session ID. If there is an existing session, the new session request may be invalid and the PCRN 202 may proceed to step 412, where the new session request may be rejected by the PCRN 202, as the session ID may be unique, so any match may indicate a matching session, regardless of any other values in the SBI. When there is no matching session ID, however, the PCRN 202 may then proceed to step 413 to check for other attributes in the SBI.

Referring now to step 413, the steps 413-415 (for IPv4 address) and steps 417-419 (for IPv6 prefix) are similar, where the PCRN 202 may first check to determine whether the SBI contains the relevant information in a first step and when the message does contain such information, checks whether the information matches an existing session. If there is a match, the PCRN 202 may proceed to step 427 to check the APN of the existing session against that of the new session request. Otherwise, if the relevant information is not included or the relevant information does not match, method 400 may proceed to then check another attribute.

Steps 421-423 are similar to the previous steps in 409-419, except that in step 423, the PCRN 202 instead of merely looking for a match, may determine whether the subscription IDs belong to the same subscriber, as a single subscriber may possess multiple subscription IDs. For example, when the PCRN 202 compares MSG1 and MSG2 in step 423, the PCRN 202 may determine that MSG1's subscription ID of "e" and MSG2's subscription TD of "b" belong to the same subscriber ("Joe"), even if the actual subscription IDs do not match. If any of the attributes match an existing attribute, then the request may be invalid and the PCRN 202 may proceed to step 427, where it compares the APN of the existing session against that of the new session establishment request. Otherwise, the PCRN 202 may proceed to step 425, where it may create a new session in response to the request. When creating a new session, the PCRN 202 may also establish an IP-CAN session, even when the message requested a new gateway control session. As will be discussed below in relation to FIG. 5, the PCRN 202 may then bind the newly established gateway control session with the IP-CAN session, as the attributes for the two sessions match and the gateway control session was the newest type of such sessions created by the PCRN 202.

In step 427, the PCRN 202 first determines whether the SBI contains an APN. If it is included in the SBI, then the PCRN 202 in step 429 determines whether there is a match with APNs of other previous messages. If there is no match, then the PCRN 202 may establish the requested new session in step 433. If, however, there is a matching APN or if no APN is included, the PCRN 202 may reject the new session request in step 431, in a similar step to step 412. The PCRN 202 may check the APN first because messages may have other common attributes and different SBIs, yet require different sessions. For example a first message MSG-A, may have an IPv4 address of 10.1.1.1 with an APN of "foo." However, if a second message MSG-B, also had an IPv4 address of 10.11.1, but had an APN of "bar," the two messages would not share the same session. If, however, neither message has an APN (i.e., the APN is equal to null), they may still share the same session if other attributes in their respective SBIs match.

Figure 5A:
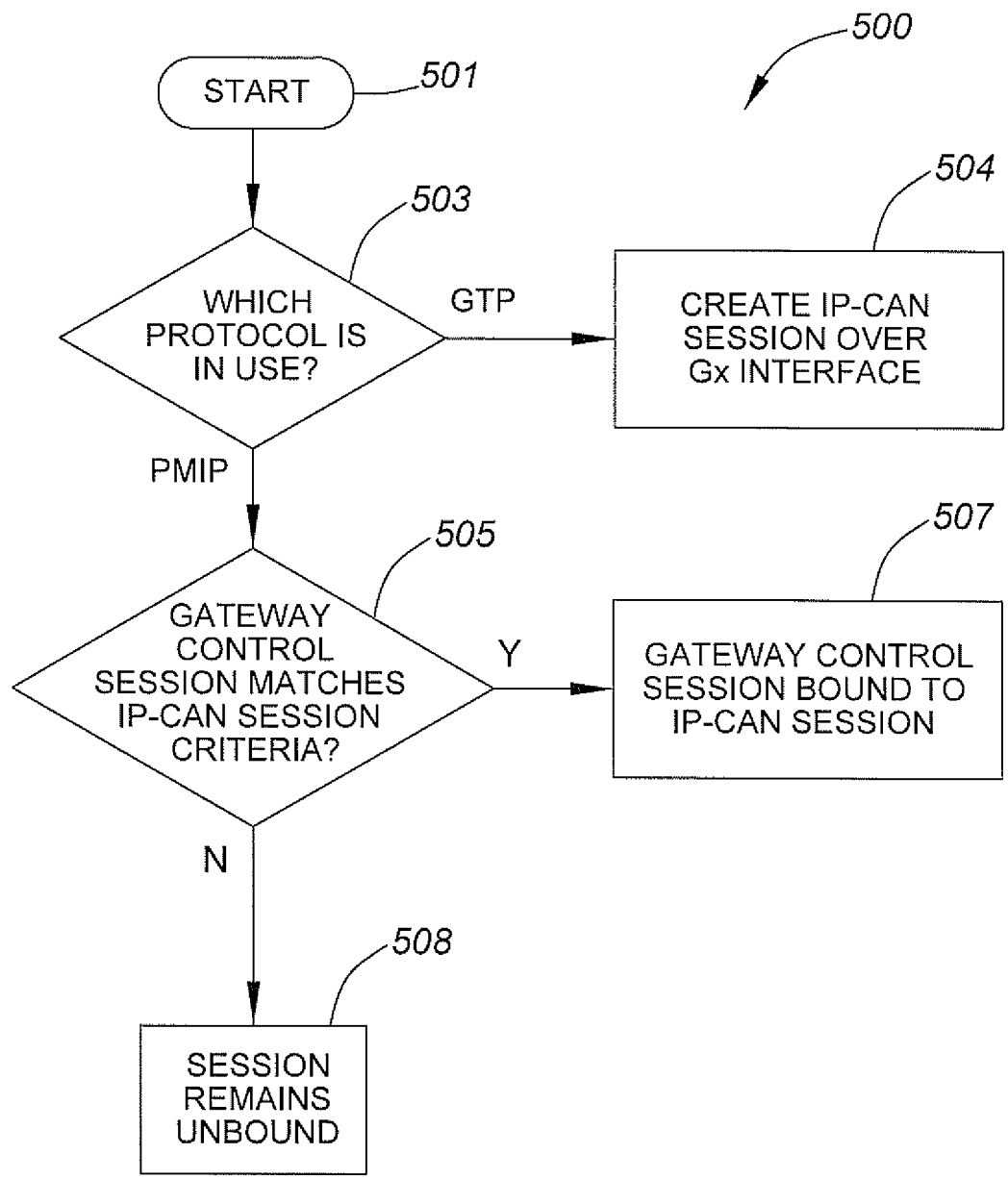
FIG. 5A illustrates an exemplary method for binding an IP-CAN session with a primary gateway out of a plurality of gateways.

Referring now to FIG. 5A, an exemplary method of binding gateway sessions is illustrated. The PCRN 202 may use either the DPA 301 or the PCRN blade 303a to employ method 500 to bind a gateway control session related to a service gateway (P-SGW 204, SGW 205) and an IP-CAN session related to a PGW 203. Depending on the protocol in use, the service gateways may not be in communication with the PCRN. Accordingly, method 500 proceeds to steps 501-503, where the PCRN 202 may first determine the type of communications protocol in use. If the protocol in use is the GPRS tunneling protocol (GTP), then the PGW 203 is the only gateway in communications with the PCRN 202. The PCRN 202 therefore may proceed to step 504, where the PCRN 202 may create an IP-CAN session via the Gx interface.

If, however, the protocol in use is PMIP, then both the PGW 203 and the service gateways 204, 205 may be in communications with the PCRN 202. In the PMIP case, there may be only one IP-CAN session, while there may be a plurality of gateway control sessions that are created by one or more service gateways 204, 205. The PCRN 202 may therefore attempt to appoint one of plurality of service gateways 204, 205 as the primary gateway 204, while the other gateways 205 may be either non-primary or backup gateways. The PCRN 202 may base the assignment of the primary gateway 204 on the best match with the IP-CAN session according to the attributes of the SBIs that created for the respective IP-CAN and gateway control sessions. For example, an IP-CAN session associated with PGW 203 may be bound to both a first gateway control session (GWC1) associated with non-primary gateway 205 and a second gateway control session (GWC2) associated with a primary gateway 204. The IP-CAN session may be bound to both, but has the second gateway control session GWC2 designated as the primary control session.

Accordingly, in step 505, the PCRN 202 may check the attributes of the gateway control session against the attributes of the IP-CAN session. This may be similar to the method 400 employed by PCRN 202 to determine if two attributes in the SBI match. However, in step 505, all the attributes must match (i.e., the IPv4 address and IPv6 prefix match, the subscription IDs belong to same subscriber, and the APNs either match or are both absent) in order to for the sessions to be bound (as will be discussed below, this may be similar to the matching criteria method employed in relation to FIG. 6). If the potential gateway control session matches all the attributes of the IP-CAN session, the PCRN 202 may then proceed to step 507, where the gateway control session may be bound to the IP-CAN session, with a record of the binding being stored in the database. If the gateway control session does not match all the criteria of the IP-CAN session, then in step 508, the PCRN 202 may create the new session in the database, but the new session may remain unbound to an IP-CAN session until a suitable match is found.

Figure 5B:
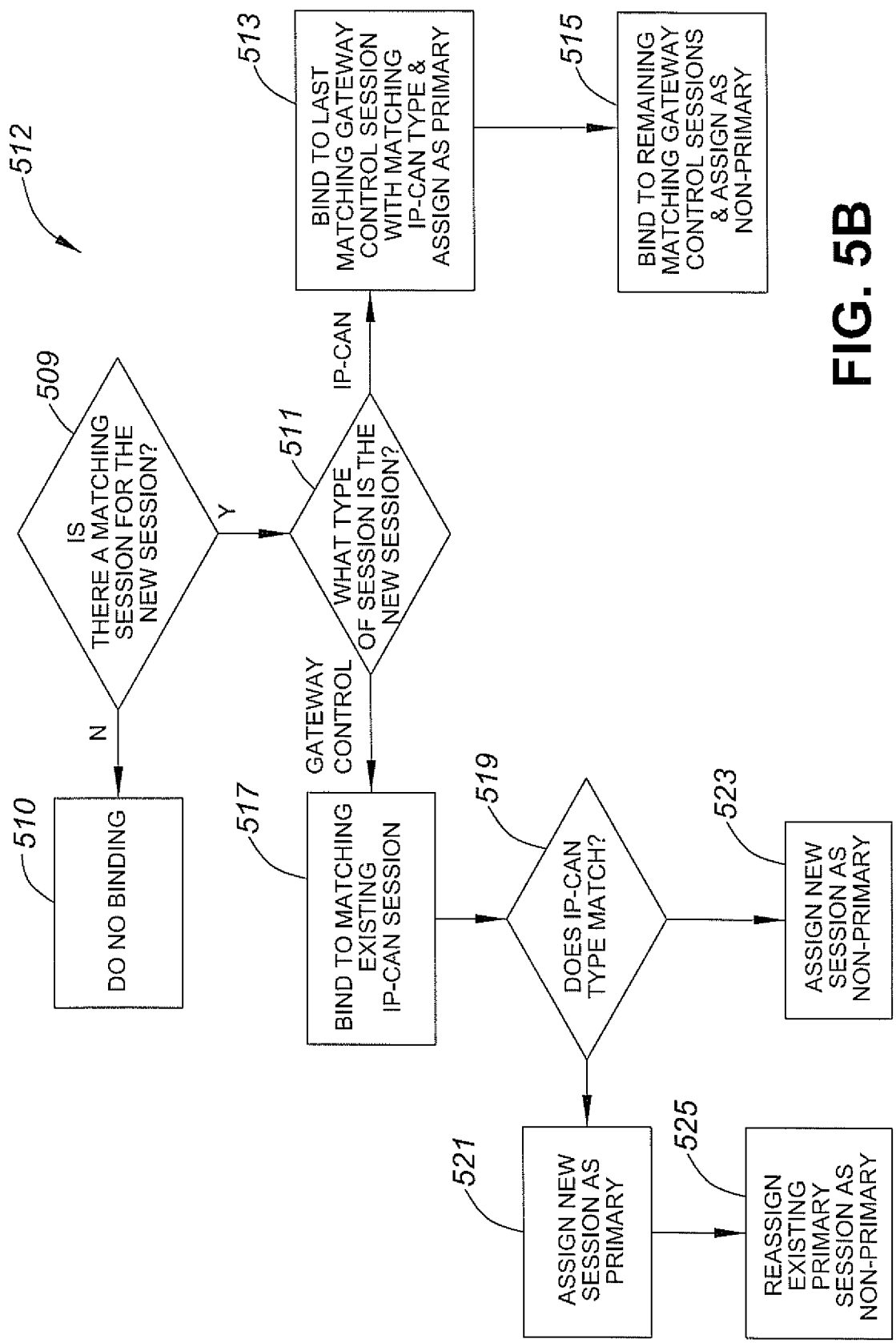
FIG. 5B illustrates an exemplary method for binding a new IP-CAN session or gateway control sessions to matching existing session.

Referring now to FIG. 5B, a related method of the PCRN 202 binding new IP-CAN sessions and gateway control sessions to suitable matches is illustrated. If either a new IP-CAN session or new gateway session is created, PCRN 202 may employ method 512 to bind existing mate sessions to it. The new session may also involve reassignment of one or more gateway control sessions as either primary or non-primary/backup. After receiving a new session, in step 509, the PCRN 202 may determine if there is a matching session for the newly-established session. This may involve steps similar to those discussed above in relation to FIG. 5A, matching, for example, IPv4 addresses, IPv4 prefixes, a unique subscriber identity, and a matching APN. If there is no matching session, the PCRN 202 may proceed to step 510, where the new session is established in the database, but the session may remain unbound until a suitable match is found.

When a new session is being established, the PCRN 202 in step 511 determines the type of new session being established. When a new IP-CAN session is being established, method 512 may proceed to step 513, where the new IP-CAN session may bind to a plurality of candidate gateway control sessions that all match the criteria of the new IP-CAN session. From this plurality of candidate gateway control sessions, the gateway control session that both matches all the criteria of the IP-CAN session and also has the same IP-CANType as the request establishing the new IP-CAN session may be bound by the PCRN 202 as the primary gateway control session, with the record of the binding being stored in the database. If there is a plurality of gateway control sessions that both have matching criteria and IP-CANType to the new IP-CAN session, the new IP-CAN session may assign as primary the gateway control session that was created last. Subsequently, in step 515, the other gateway control sessions that match the criteria of the new IP-CAN session may also be bound to the new IP-CAN session by the PCRN 202, with the record of the binding being stored in the database.

Returning to step 511, if a new gateway control session is being established, the PCRN 202 in step 517 may bind the new gateway control session to an existing IP-CAN session that has matching attributes, while recording the binding in the database. In step 519, the PCRN 202 may then check the IP-CANType of the request establishing the new gateway control session to determine if it matches the IP-CANType of the matching IP-CAN session. If there is a match, the PCRN 202 may then in step 521 assign the new gateway control session as the primary. Next, in step 525, the PCRN may then reassign any previously-primary gateway control session as a non-primary/backup gateway control session, recording the reassignment in the database. However, if at step 519, it is found that the IP-CANType of the new gateway control session and the IP-CAN session do not match, then at step 525, the new gateway control session may be bound to the IP-CAN session by the PCRN 202 as a non-primary gateway.

Figure 6:
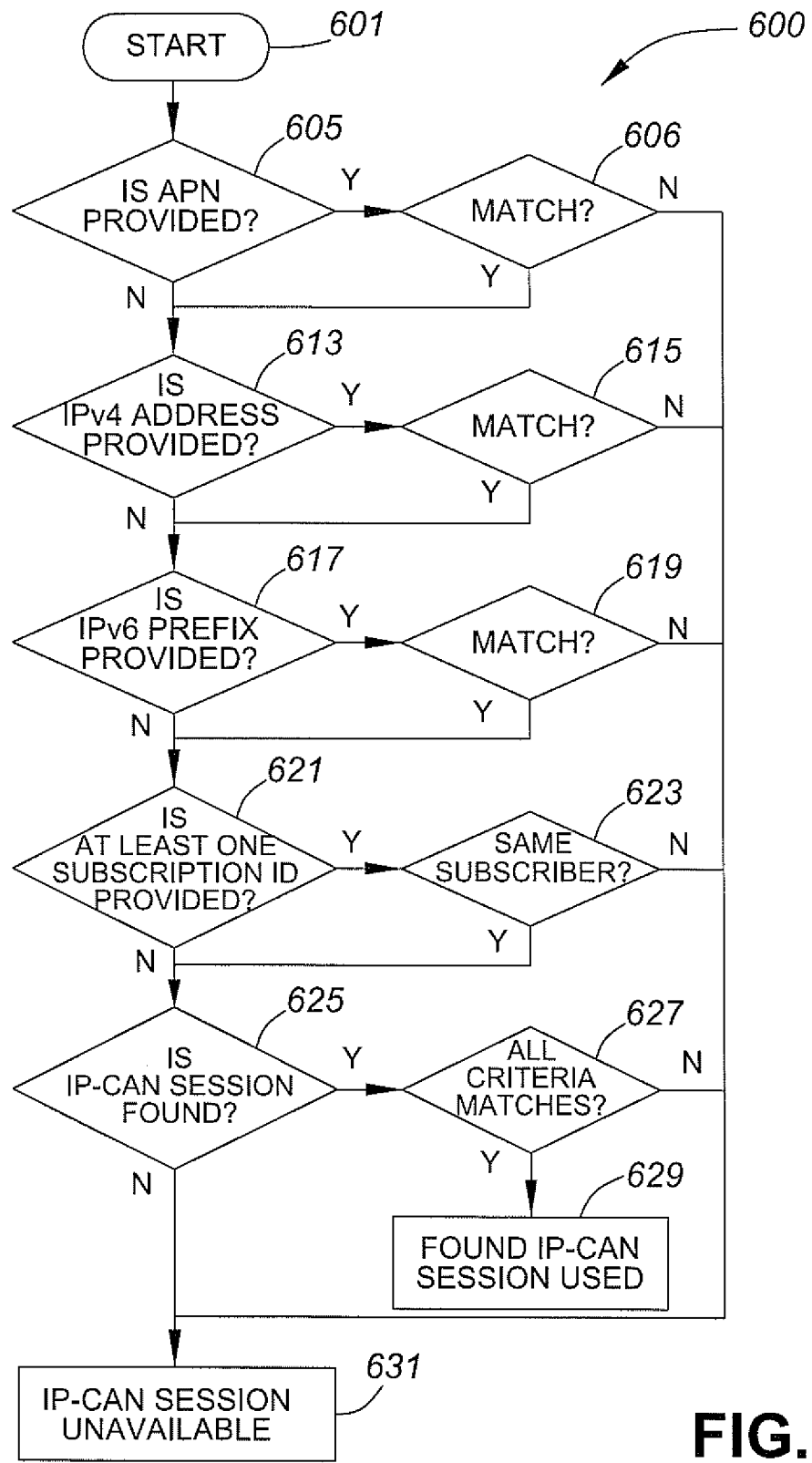
FIG. 6 illustrates an exemplary method for binding a session established by an application node (AN) with an IP-CAN session established by a gateway.

Referring now to FIG. 6, an exemplary method for binding an application session to an IP-CAN session is illustrated. Application sessions established by application node (AN) 201 may be bound to an IP-CAN session. The PCRN 202 may employ method 600 to use the SBI attributes of the incoming message to match with an established IP-CAN session. Similar to method 400 in FIG. 4, if all the available attributes match the IP-CAN session criteria, the PCRN 202 may proceed to step 629, where the application session is bound to the matching IP-CAN session found by the PCRN 202. Otherwise, if any of the available attributes from the SBI of the application session do not match the criteria of the target IP-CAN session, the PCRN 202 may proceed to step 631, where the target IP-CAN session may be unavailable for binding.

Steps 605-606 may be similar to steps 427-429 of method 400 in FIG. 4, where the PCRN 202 may compare the APN of the application session with the APN of the target IP-CAN session to see if they match. However, if the APNs of the application session and the APN of the IP-CAN session match or if there is no available APN for the application session, the PCRN 202 may proceed to step 613, where it may examine another potential SBI attribute in the application session. Otherwise, if the available APN in the application session does not match the APN of the IP-CAN session, then the PCRN 202 may proceed to step 631, where the sessions remain unbound. Steps 613-615 (IPv4 address) and steps 617-619 (IPv6 prefix) may be similar to steps 605-606, ensuring that any available attributes in the application session's SBI match the criteria of the target IP-CAN session.

In step 621, the PCRN 202 may check the multiple subscription IDs of the application session. Instead of ensuring that the subscription IDs match, the PCRN 202 may act in a way similar to step 423, where the PCRN 202 may ensure that the subscriber associated with the subscription ID of the application session also is associated with the subscription ID of the IP-CAN session. Similar to the previous steps, if the subscriber matches, then the PCRN 202 may proceed to check the next attribute; if the subscriber does not match, then the sessions are not bound together.

In step 625, the PCRN 202 may ensure again that a matching IP-CAN session is found as a target for binding. If one is found, in step 627, the PCRN 202 again may ensure that all available attributes in the SBI of the application session matches the applicable criteria in the IP-CAN session. If the attributes match, the PCRN 202 may then proceed to step 629, where the target IP-CAN session is used and bound to the application session. If the criteria do not match or if a matching IP-CAN session is not found, then the PCRN 202 may proceed to step 631, where the PCRN 202 does not bind the application session with the target IP-CAN session.

According to the foregoing, various exemplary embodiments provide for dynamic association of messages from diverse sources when received by the PCRN. Particularly, by comparing available attributes of session binding identifiers (SBIs) included in each incoming message, the PCRN may associate messages and their applicable sessions together within subcomponents of the PCRN.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a Diameter device to associate at least two messages received from a plurality of devices, the method comprising:
   receiving a first message from a first device, the first message including a first identifier;
   processing the first message, wherein the processing results in a first policy and charging rules node (PCRN) blade creating a first session;
   receiving a second message from a second device, the second message including a second identifier, wherein the second identifier is different from the first identifier;
   determining whether the second message relates to a gateway control session or an application node session;
   based on the second message relating to a gateway control session, determining whether the second identifier matches the first identifier according to a first matching method;
   based on the second message relating to an application node session, determining whether the second identifier matches the first identifier according to a second matching method, wherein the second matching method is different from the first matching method; and
   based on determining that the second identifier matches the first identifier, processing the second message based on the association.

2. The method of claim 1, wherein the first identifier is a first Session Binding Identifier (SBI) and the second identifier is a second SBI, wherein the first SBI and the second SBI each include at least one of:
   a session identification;
   an IPv4 address;
   an IPv6 address;
   an Access Point Name (APN); and
   at least one subscription identification (SID),
   wherein the attributes comprising the first and second SBI also comprise attributes in at least one subscriber profile record.

3. The method of claim 2, wherein the first matching method comprises:
   determining that the second identifier matches the first identifier only when:
      the APN of the first SBI is the same as the APN of the second SBI,
      the IPv4 address of the first SBI is the same as the IPv4 address of the second SBI,
      the IPv6 address of the first SBI is the same as the IPv6 address of the second SBI, and
      the at least one SID of the first SBI corresponds to the same subscriber as the at least one SID of the second SBI.

4. The method of claim 2, wherein the second matching method comprises:
   determining whether the second SBI carries an APN;
   based on the second SBI carrying an APN, determining whether the APN of the second SBI is the same as an APN of the first SBI;
   determining whether the second SBI carries an IPv4 address;

based on the second SBI carrying an IPv4 address, determining whether the IPv4 address of the second SBI is the same as an IPv4 address of the first SBI;
determining whether the second SBI carries an IPv6 address;
based on the second SBI carrying an IPv6 address, determining whether the IPv6 address of the second SBI is the same as an IPv6 address of the first SBI;
determining whether the second SBI carries at least one SID;
based on the second SBI carrying at least one SID, determining whether the at least one SID of the second SBI corresponds to the same subscriber as at least one SID of the first SBI; and
determining that the second identifier matches the first identifier when the second SBI does not carry at least one of: an APN, an IPv4 address, an IPv6 address, and at least one SID.

5. The method of claim 4, wherein the second matching method determining that the second identifier matches the first identifier further comprises determining whether all criteria among an APN, IPv4 address, IPv6 address, and at least one SID, that are carried by the second SBI are the same as corresponding criteria carried by the first SBI.

6. The method of claim 4, further comprising:
determining the communications protocol of the second message, wherein the second message includes a session ID correlating to a first gateway control session; and
binding the first gateway control session to three IP-CAN session as a primary gateway when the second SBI of the second message and the first SBI of the first message correlate to the same subscriber profile.

7. The method of claim 6, further comprising:
receiving a third message from a third device, the third message containing a third SBI comprising at least one attribute associated with a third subscriber profile, wherein the third message includes a session ID correlating to a second gateway control session;
binding the second gateway control session to the IP-CAN session as the primary gateway when the third SBI of the third message and the first SBI of the first message correlate to the same subscriber profile; and
binding the first gateway control session to the IP-CAN session as a non-primary gateway when the third SBI of the third message and the first SBI of the first message correlate to the same subscriber profile.

8. The method of claim 1, wherein at least one of the first matching method and the second matching method comprises:
determining that the second identifier corresponds to a subscriber profile record;
determining whether the first identifier corresponds to the subscriber profile record;
based on determining that the first identifier corresponds to the subscriber profile record, determining that the second identifier matches the first identifier; and
based on determining that the first identifier does not correspond to the subscriber profile record, processing the second message, wherein the processing results in a second PCRN blade creating a second session.

9. The method of claim 1, wherein:
the Diameter device is a Diameter Proxy Agent (DPA), and further comprising,
processing the first message comprises forwarding the first message to the first PCRN blade, and
processing the second message based on the association comprises forwarding the second message to the first PCRN blade based on the first message being forwarded to the first PCRN blade.

10. A Policy and Charging Rules Node (PCRN) to associate at least two messages received from a plurality of devices, the PCRN comprising:
a Diameter device configured to:
receive at least a first message from a first device, the first message containing a first Session Binding Identifier (SBI),
receive a second message from a second device, the second message containing a second SBI,
determine whether the second message relates to a gateway control session or an application node session;
based on the second message relating to a gateway control session, determine whether the second identifier matches the first identifier according to a first matching method;
based on the second message relating to an application node session, determine whether the second identifier matches the first identifier according to a second matching method, wherein the second matching method is different from the first matching method; and
based on determining that the second identifier matches the first identifier, process the second message based on the association.

11. The PCRN of claim 10, wherein the first and second SBI each include at least one of:
a session identification;
an IPv4 address;
an IPv6 address;
an Access Point Name (APN); and
at least one subscription identification (SID),
wherein the attributes comprising the first and second SBI also comprise attributes in at least one subscriber profile record.

12. The PCRN of claim 11, wherein the first matching method comprises:
determining that the second identifier matches the first identifier only when:
the APN of the first SBI is the same as the APN of the second SBI,
the IPv4 address of the first SBI is the same as the IPv4 address of the second SBI,
the IPv6 address of the first SBI is the same as the IPv6 address of the second SBI, and
the at least one SID of the first SBI corresponds to the same subscriber as the at least one SID of the second SBI.

13. The PCRN of claim 11, wherein the second matching method comprises:
determining whether the second SBI carries an APN;
based on the second SBI carrying an APN, determining whether the APN of the second SBI is the same as an APN of the first SBI;
determining whether the second SBI carries an IPv4 address;
based on the second SBI carrying an IPv4 address, determining whether the IPv4 address of the second SBI is the same as an IPv4 address of the first SBI;
determining whether the second SBI carries an IPv6 address;
based on the second SBI carrying an IPv6 address, determining whether the IPv6 address of the second SBI is the same as an IPv6 address of the first SBI;

determining whether the second SBI carries at least one SID;

based on the second SBI carrying at least one SID, determining whether the at least one SID of the second SBI corresponds to the same subscriber as at least one SID of the first SBI; and determining that the second identifier matches the first identifier when the second SBI does not carry at least one of: an APN, an IPv4 address, an IPv6 address, and at least one SID.

14. The PCRN of claim 13, the second matching method determining that the second identifier matches the first identifier further comprises determining whether all criteria among an APN, IPv4 address, IPv6 address, and at least one SID, that are carried by the second SBI are the same as corresponding criteria carried by the first SBI.

15. The PCRN of claim 13, wherein the DPA determines the communications protocol of the second message, the second message including a session ID correlating to a first gateway control session, and the first PCRN blade binds the first gateway control session to the IP-CAN session as a primary gateway when the second SBI of the second message and the first SBI of the first message correlate to the same subscriber profile.

16. The PCRN of claim 15, wherein the DPA:

receives a third message from a third device, the third message containing a third SBI comprising at least one attribute associated with a third subscriber profile, wherein the third message includes a session ID correlating to a second gateway control session, binds the second gateway control session to the IP-CAN session as the primary gateway when the third SBI of the third message and the first SBI of the first message correlate to the same subscriber profile, and binds the first gateway control session to the IP-CAN session as a non-primary gateway when the third SBI of the third message and the first SBI of the first message correlate to the same subscriber profile.

17. The PCRN of claim 10, further comprising a plurality of policy and charging rules node (PCRN) blades, wherein:

the Diameter device is a Diameter Proxy Agent (DPA), and in processing the second message based on the association, the DPA is configured to forward the second message to a PCRN blade of the plurality of PCRN blades based on the first message being forwarded to the PCRN blade.

18. A non-transitory machine-readable storage medium encoded with instructions for a Diameter Proxy Agent (DPA) within a Policy and Charging Rules Node (PCRN) to associate at least two messages received from a plurality of devices, the machine-readable storage medium comprising:

instructions for receiving a first message from a first device, the first message containing a first Session Binding Identifier (SBI);

instructions for forwarding the first message to a first PCRN blade in a plurality of PCRN blades comprising the PCRN, the first PCRN blade creating a first session for the first message;

instructions for receiving a second message from a second device, the second message containing a second SBI, wherein the second SBI is not the same as the first SBI;

determining whether the second message relates to a gateway control session or an application node session;

based on the second message relating to a gateway control session, determining whether the second SBI matches the first SBI according to a first matching method;

based on the second message relating to an application node session, determining whether the second SBI matches the first SBI according to a second matching method, wherein the second matching method is different from the first matching method; and instructions for forwarding, by the DPA, the second message to the first PCRN blade when the second SBI matches to the first SBI.

19. The non-transitory machine-readable storage medium of claim 18, wherein the first and second SBI are comprised of a set of attributes, the attributes including at least one of:

a session identification;
an IPv4 address;
an IPv6 address;
an Access Point Name (APN); and
at least one subscription identification (SID),
wherein the attributes comprising the first and second SBI also comprise attributes in at least one subscriber profile.

20. The non-transitory machine-readable storage medium of claim 18, wherein the first matching method comprises determining that the second identifier matches the first identifier only when:

the APN of the first SBI is the same as the APN of the second SBI, the IPv4 address of the first SBI is the same as the IPv4 address of the second SBI, the IPv6 address of the first SBI is the same as the IPv6 address of the second SBI, and the at least one SID of the first SBI corresponds to the same subscriber as the at least one SID of the second SBI.

\* \* \* \* \*